US011772309B2

(12) United States Patent
Wagner et al.

(10) Patent No.: US 11,772,309 B2
(45) Date of Patent: Oct. 3, 2023

(54) FLEXIBLE FOAMING PROCESS FOR PRODUCING THERMALLY INSULATED ARTICLES

(71) Applicant: BASF SE, Ludwigshafen am Rhein (DE)

(72) Inventors: Hendrik Wagner, Lemfoerde (DE); Marko Grever, Lemfoerde (DE); Joachim Holle, Lemfoerde (DE); Joerg Krogmann, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/757,461

(22) PCT Filed: Dec. 8, 2020

(86) PCT No.: PCT/EP2020/085138
§ 371 (c)(1),
(2) Date: Jun. 16, 2022

(87) PCT Pub. No.: WO2021/122177
PCT Pub. Date: Jun. 24, 2021

(65) Prior Publication Data
US 2023/0025840 A1    Jan. 26, 2023

(30) Foreign Application Priority Data

Dec. 17, 2019 (EP) .................................. 19217206

(51) Int. Cl.
| | | |
|---|---|---|
| *B29C 44/34* | (2006.01) | |
| *B29C 44/06* | (2006.01) | |
| *B29C 44/08* | (2006.01) | |
| *B29C 45/16* | (2006.01) | |
| *C08G 18/48* | (2006.01) | |
| *C08G 18/76* | (2006.01) | |
| *C08J 9/14* | (2006.01) | |
| *B29K 75/00* | (2006.01) | |
| *B29K 105/04* | (2006.01) | |
| *B29L 31/00* | (2006.01) | |

(52) U.S. Cl.
CPC .......... *B29C 44/3442* (2013.01); *B29C 44/06* (2013.01); *B29C 44/08* (2013.01); *B29C 45/16* (2013.01); *C08G 18/4829* (2013.01); *C08G 18/4845* (2013.01); *C08G 18/7664* (2013.01); *C08J 9/141* (2013.01); *C08J 9/144* (2013.01); *C08J 9/146* (2013.01); *B29K 2075/00* (2013.01); *B29K 2105/046* (2013.01); *B29K 2995/0015* (2013.01); *B29L 2031/7152* (2013.01); *B29L 2031/7622* (2013.01); *C08G 2110/0025* (2021.01); *C08G 2330/00* (2013.01); *C08J 2203/14* (2013.01); *C08J 2203/162* (2013.01); *C08J 2205/052* (2013.01); *C08J 2205/10* (2013.01); *C08J 2375/04* (2013.01)

(58) Field of Classification Search
CPC ............................................... B29L 2031/7622
See application file for complete search history.

(56) References Cited

U.S. PATENT DOCUMENTS

| | | | | |
|---|---|---|---|---|
| 3,304,273 A * | 2/1967 | Stamberger | .......... | C08G 18/632 521/157 |
| 3,383,351 A | 5/1968 | Stamberger | | |
| 3,801,059 A * | 4/1974 | Lippold | .............. | B29C 44/1233 249/162 |
| 4,381,351 A * | 4/1983 | Szabat | ................... | C08J 9/0066 521/107 |
| 4,691,906 A * | 9/1987 | Zastrow | ................ | B29C 33/202 269/287 |
| 5,084,486 A * | 1/1992 | Patten | ................. | C08G 18/0895 521/917 |
| 5,157,059 A * | 10/1992 | Bauer | ..................... | C08G 18/08 521/917 |
| 5,530,035 A * | 6/1996 | Ferrero-Heredia | ......................... | C08G 18/0885 528/48 |
| 8,293,807 B2 * | 10/2012 | Emge | .................. | C08G 18/4072 521/137 |
| 9,926,421 B2 * | 3/2018 | Albers | ...................... | C08J 9/141 |
| 11,338,481 B2 * | 5/2022 | Costanza | ............ | B29C 44/1285 |
| 2006/0058409 A1 * | 3/2006 | Zaschke | ............... | C08G 18/632 521/155 |
| 2007/0254973 A1 * | 11/2007 | Emge | .................... | C08G 18/635 521/170 |
| 2007/0259981 A1 * | 11/2007 | Eling | .................. | C08G 18/7664 521/170 |
| 2008/0029921 A1 * | 2/2008 | Corradi | ............... | B29C 44/3403 425/4 R |
| 2008/0269367 A1 * | 10/2008 | Neill | .................. | C08G 18/4211 521/137 |
| 2010/0158614 A1 * | 6/2010 | Kalinowski | ............... | F16L 3/02 521/97 |

(Continued)

FOREIGN PATENT DOCUMENTS

| | | |
|---|---|---|
| DE | 1111394 B | 7/1961 |
| DE | 1152536 B | 8/1963 |

(Continued)

OTHER PUBLICATIONS

International Search Report dated Mar. 15, 2021 in PCT/EP2020/085138, 3 pages.

(Continued)

*Primary Examiner* — Benjamin A Schiffman
(74) *Attorney, Agent, or Firm* — Grüneberg and Myers, PLLC

(57) ABSTRACT

A flexible discontinuous process produces a series of at least two articles containing thermally insulating polyurethane foam from at least three streams (A), (B) and (C). The process involves mixing the at least three streams with different mixing ratios and injecting the mixture into cavities of the articles. A production unit can be used for performing this process.

15 Claims, No Drawings

(56) References Cited

U.S. PATENT DOCUMENTS

| | | | |
|---|---|---|---|
| 2010/0240786 A1* | 9/2010 | Glos | C08J 9/141 |
| | | | 521/170 |
| 2011/0039964 A1* | 2/2011 | Wiliams | C08J 9/144 |
| | | | 521/131 |
| 2011/0221085 A1 | 9/2011 | Fiorentini et al. | |
| 2012/0009414 A1 | 1/2012 | Golini | |
| 2012/0180400 A1* | 7/2012 | Benson-Sargent | B29B 7/7404 |
| | | | 51/296 |
| 2012/0297813 A1* | 11/2012 | Hanley | B29C 44/065 |
| | | | 62/331 |
| 2013/0079429 A1* | 3/2013 | Hager | C08G 18/4866 |
| | | | 521/123 |
| 2016/0311961 A1* | 10/2016 | Klostermann | C08G 18/18 |
| 2016/0340464 A1* | 11/2016 | McVey | C08G 18/4837 |
| 2016/0376397 A1 | 12/2016 | Dedecker et al. | |
| 2018/0055142 A1* | 3/2018 | Yu | A43B 13/04 |
| 2019/0330406 A1* | 10/2019 | Ahmadloo | C08G 18/485 |
| 2021/0079189 A1* | 3/2021 | Shinko | C08G 18/242 |
| 2021/0269579 A1* | 9/2021 | Wagner | C08G 18/638 |

FOREIGN PATENT DOCUMENTS

| | | | | |
|---|---|---|---|---|
| DE | 1152537 B | 8/1963 | | |
| DE | 1222669 B | 8/1966 | | |
| DE | 3612125 A1 | 10/1987 | | |
| EP | 2148156 B1 | 9/2019 | | |
| FR | 2805475 A1 | 8/2001 | | |
| WO | WO-9960045 A1 * | 11/1999 | ......... | C08G 18/4072 |
| WO | WO-2011/134856 A1 | 11/2011 | | |
| WO | WO-2011/134866 A2 | 11/2011 | | |
| WO | WO-2011/134866 A3 | 2/2012 | | |
| WO | WO-2020/002104 A1 | 1/2020 | | |

OTHER PUBLICATIONS

Written Opinion dated Mar. 15, 2021 in PCT/EP2020/085138, 6 pages.
European Search Report for EP Patent Application No. 19217206.2, dated Jun. 25, 2020, 4 pages.
International Preliminary Report on Patentability received for PCT Application No. PCT/EP2020/085138, dated May 17, 2022, 8 pages.

* cited by examiner

FLEXIBLE FOAMING PROCESS FOR PRODUCING THERMALLY INSULATED ARTICLES

CROSS-REFERENCE TO RELATED APPLICATIONS

This application is the National Stage entry under § 371 of International Application No. PCT/EP2020/085138, filed on Dec. 8, 2020, and which claims the benefit of priority to European Application No. 19217206.2, filed on Dec. 17, 2019. The content of each of these applications is hereby incorporated by reference in its entirety.

BACKGROUND OF THE INVENTION

Field of the Invention

The present invention relates to a flexible discontinuous process for producing a series of at least two articles containing thermally insulating polyurethane foam from at least three streams (A), (B) and (C) by mixing the at least three streams with different mixing ratios and injecting the mixture into cavities of the articles, and to a production unit for performing this process.

Description of Related Art

Articles like refrigerators, freezers, water heaters, cold boxes etc. containing thermally insulating polyurethane foam are produced by mixing an isocyanate reactive component (component (A), also called polyol component) and an isocyanate component (component (B)) and injecting the mixture into the cavity of the article which should be filled with the thermally insulating polyurethane foam. The mixture reacts and the polyurethane foam is generated in situ within the cavity of the article. A process of producing polyurethane foam containing articles from one polyol containing stream and one isocyanate containing stream is described in EP 2148156 A1. A process for producing articles comprising a polyurethane foam prepared in situ by mixing a first stream containing polyol, a second stream containing isocyanate component and a third stream containing a pressure and temperature sensitive component and injecting the reaction mixture into a hollow mold is disclosed in DE 3612125 A1. Not yet published international application PCT/EP2019/066252 is related to a process for producing foamed articles by mixing at least one stream containing a polyol, a second stream containing an isocyanate and a third stream containing a further component, which is not compatible with first and/or second stream.

The mixing of the components usually takes place in a mixing head or an assembly of mixing heads in case of multi-point injection to one mold which are connected to reservoirs of at least components (A), (B) and optionally further components via feeding tubes or pipes. Components (A) and (B) are carefully designed by selecting specific combinations of ingredients like different polyols, isocyanates, catalysts, blowing agents, surfactants etc. to yield polyurethane foams showing the property profiles required by the different producers or for different purposes. Components (A) and (B) are commonly delivered separately as ready to use mixtures by suppliers to the producers of thermally insulated articles, e.g. in barrels, intermediate bulk containers or tank wagons. For a specific polyurethane foam, a specific component (A) and a specific component (B) are used in a specific mixing ratio. For another polyurethane foam differing from the first polyurethane foam a different component (A) and/or (B) might be necessary. In case a different component (A) and/or (B) should be used in the same production unit or production line, the reservoir(s) of component (A) and/or (B) have to be changed, the feeding tubes or pipes have to be changed or cleaned and the inlets and outlets to the mixing head have to be cleaned before the production of articles comprising the other polyurethane foam can start. This results in a loss of raw material and time and the generation of waste. Alternatively, further tank farms could be installed for each alternative component, which would lower cleaning efforts, but is related to high capital expenditures.

The composition of the polyurethane reaction mixture used in the production of articles comprising a thermally insulating polyurethane foam has to be changed for example for the production of refrigerators of different geometry, which requires the adaption of viscosity and reactivity of the polyurethane reaction mixture, or the production of refrigerators of different energy classes which are inter alia produced with different blowing agents. Also, the chemical resistance of the materials used as liner, casing, mold etc. against certain components of the polyurethane foam like certain physical blowing agents may require an adaption of the polyurethane reaction mixture. Moreover, climate parameters and ambient conditions like temperature, humidity, and air pressure may vary during the production of a series of articles and in consequence influence the production process, which might also lead to the necessity to apply different recipes for PU foams to guarantee constant processing over time. An example for such change of the ambient conditions is a change of the room temperature of the production place which may require the adaption of catalyst, e.g. changing the catalyst composition and/or concentration to accelerate or reduce the foaming reaction time. So, there is a need for a flexible production process, which allows the production of different articles comprising thermally insulating polyurethane foam on one production line or production unit without the need of changing and/or cleaning feeding pipes and the mixing heads.

SUMMARY OF THE INVENTION

It was an object of the invention to provide a process for producing articles thermally insulated by polyurethane foams, which is flexible and allows the production of thermally insulated articles containing different polyurethane foams without the necessity of cleaning and/or changing feeding tubes or pipes and the inlets and outlets to the mixing head. A further object of the invention was to provide a production unit for performing such process.

This object is achieved by a discontinuous process for producing a series of at least two articles containing thermally insulating polyurethane foam from at least
(A) a first stream comprising at least one isocyanate reactive compound,
(B) a second stream comprising at least one organic polyisocyanate, and
(C) a third stream comprising at least one compound selected from isocyanate reactive compounds, organic polyisocyanates, catalysts, blowing agents, chain extenders, stabilizers, crosslinkers, flame retardants, and additives, wherein stream (C) is different from both streams (A) and (B);

wherein the process comprises the steps
(a) producing at least one first article by
  (a1) providing a first polyurethane reaction mixture in a mixing device (MD) by mixing at least streams (A), (B) and (C);
  (a2) injecting the first polyurethane reaction mixture provided in step (a1) into a cavity of the at least one first article and forming the thermally insulating polyurethane foam; and
(b) producing at least one second article by
  (b1) providing a second polyurethane reaction mixture in the mixing device (MD) by mixing at least streams (A), (B) and (C);
  (b2) injecting the second polyurethane reaction mixture provided in step (b1) into a cavity of the at least one second article and forming the thermally insulating polyurethane foam;
wherein
the mixing ratio of streams (A), (B) and (C) in step (a1) is different from the mixing ratio of streams (A), (B) and (C) in step (b1),
the amount of stream (C) may be zero either in step (a1) or in step (b1), and
in case the amount of stream (C) is not zero in step (a1) or (b1), the amount of either stream (A) or (B) may be zero.

In another aspect, the present invention is directed to a computer implemented process for producing a series of at least two articles containing thermally insulating polyurethane as described above, wherein the mixing ratios in steps (a1) and (b1) are controlled by a control unit configured to control the feeding of the at least three streams (A), (B), and (C) in steps (a1) and (b1) into the mixing device (MD).

In another aspect, the present invention is directed to a production unit for producing a series of at least two articles containing thermally insulating polyurethane foam as defined above.

In still another aspect, the present invention is directed to a computer program comprising instructions to cause the production unit to execute the steps of the computer implemented process described above and a computer-readable medium having stored there on the computer program.

DETAILED DESCRIPTION OF THE INVENTION

The inventive process allows the production of at least one first and one second thermally insulated articles wherein the composition of the polyurethane reaction mixture used for the production of the thermally insulated articles is changed between the production of the at least one first and at least one second article just by adjusting the ratio of the at least three streams (A), (B) and (C), i.e. without the need of changing and/or cleaning the feeding pipes or tubes or the mixing head. This adjustment of the mixing ratio of the at least three streams is performed according to predefined values. Examples of the effects of variation of the mixing ratio of the at least three streams (A), (B) and (C) are different reaction rate profiles, e.g. via variation of catalyst amount, and different densities, e.g. via variation of blowing agent and/or water content.

In the following the invention is described in detail.

One aspect of the present invention is a discontinuous process for producing a series of at least two articles containing thermally insulating polyurethane foam from at least
(A) a first stream comprising at least one isocyanate reactive compound,
(B) a second stream comprising at least one organic polyisocyanate, and
(C) a third stream comprising at least one compound selected from isocyanate reactive compounds, organic polyisocyanates, catalysts, blowing agents, chain extenders, stabilizers, crosslinkers, flame retardants, and additives, wherein stream (C) is different from both streams (A) and (B);

wherein the process comprises the steps
(a) producing at least one first article by
  (a1) providing a first polyurethane reaction mixture in a mixing device (MD) by mixing at least streams (A), (B) and (C);
  (a2) injecting the first polyurethane reaction mixture provided in step (a1) into a cavity of the at least one first article and forming the thermally insulating polyurethane foam; and
(b) producing at least one second article by
  (b1) providing a second polyurethane reaction mixture in the mixing device (MD) by mixing at least streams (A), (B) and (C);
  (b2) injecting the second polyurethane reaction mixture provided in step (b1) into a cavity of the at least one second article and forming the thermally insulating polyurethane foam;
wherein
the mixing ratio of streams (A), (B) and (C) in step (a1) is different from the mixing ratio of streams (A), (B) and (C) in step (b1),
the amount of stream (C) may be zero either in step (a1) or in step (b1), and
in case the amount of stream (C) is not zero in step (a1) or (b1), the amount of either stream (A) or (B) may be zero.

The process is a discontinuous process for producing a series of at least two articles containing thermally insulating polyurethane foam. "Discontinuous process" means, that at least two articles are produced one after the other, wherein the injection of the polyurethane reaction mixture is interrupted after production of the first article and is continued for the second article, i.e. a first article is produced by injecting the polyurethane foam reaction mixture and the injection is stopped after injection of a sufficient amount of the polyurethane foam reaction mixture into the first article. The injection is continued with the next article to be produced.

The articles produced according to the present process may be selected from all articles containing a thermally insulating polyurethane foam, wherein the polyurethane foam is prepared in situ by injecting the polyurethane reaction mixture into the cavity provided for the thermally insulating foam. Examples of such articles are refrigerators like fridges and freezers; water heater; insulating boxes for hot and cold goods; hot water storage tanks; insulation boards; and pipes. Usually the at least first article produced in step (a) and the at least one second article produced in step (b) of the present process are different. They may e.g. be different in respect to following properties: geometry of the articles, geometry and/or volume of the cavity filled by the polyurethane foam, thermal conductivity of the polyurethane foam, chemical composition of the polyurethane foam, composition of polyols present in the foam, amount and type of blowing agent present in the foam, amount and type of additives like surfactants and flame retardants, etc., amount and type of catalysts present in the foam, etc. Preferably the first and the second article differ in at least one physical and/or chemical property. Such physical or chemical property include the properties mentioned before.

The term "polyurethane" is known by the person skilled in the art as including not only polymers containing urethane groups but as also including polymers containing no or very low amounts of urethane groups, as long as these polymers are derived from difunctional or polyfunctional isocyanates, see Polyurethane Handbook, $2^{nd}$ edition 1993, editor Guenter Oertel, Carl Hanser Verlag Munich, Chapter 2.1.1. Examples are polyetherureas, polyisocyanurates, polyureas and polycarbodiimides.

Polyurethane (PU) foams can be produced in a known manner by reacting organic polyisocyanates with one or more compounds containing at least two reactive hydrogen atoms, preferably polyamines, polyether, polyester and/or polyether ester alcohols (polyols), in the presence of blowing agents, catalysts and optionally auxiliaries such as stabilizers, chain extenders, cross linkers, flame retardants and further additives. The mixture containing all reactants and additives for producing the PU foam is herein also called polyurethane reaction mixture. This polyurethane reaction mixture is injected into the cavity to be filled with the polyurethane foam. The polyurethane reaction mixture reacts and expands thereby forming the polyurethane foam which fills the cavity.

Preferably the polyurethane foam is a rigid closed-cell polyurethane foam. The term "closed cell" as used herein means that the foam has a content of open cells of up to 20%, preferred up to 10% and most preferred up to 5%, see Polyurethane Handbook, $2^{nd}$ edition, 1993, editor Guenter Oertel, Carl Hanser Verlag Munich, Chapter 6.3.1.4. The content of open cells may be determined according to DIN EN ISO 4590 valid in 2016. Such foams are known to the person skilled in the art and are especially valued for their thermal insulation properties. The preparation of closed-cell rigid polyurethane foams and their application is e.g. described in Polyurethane Handbook, $2^{nd}$ edition, editor Guenter Oertel, Hanser Publishers Munich 1993, Chapter 6.

The thermally insulating polyurethane has preferably a lambda value in the range of from 16 to 35 mW/(m*K), more preferred in the range of from 17 to 33 mW/(m*K), and in particular in the range of from 18 to 26 mW/(m*K).

Preferably, the closed-cell rigid polyurethane foam used in the thermal insulation element has a free rise density of at maximum 200 g/L, preferably of from 15 to 200 g/L, more preferred of from 16 to 150 g/L even more preferred of from 18 to 80 g/L, most preferred of from 20 to 60 g/L.

According to the invention the thermally insulating polyurethane foam is produced from at least a first stream (A), a second stream (B), and a third stream (C).

Stream (A) comprises at least one isocyanate reactive compound. The isocyanate reactive compound usually contains at least two groups which are reactive towards isocyanate. Preferably the isocyanate reactive groups comprise a reactive hydrogen, e.g. the isocyanate reactive group may be selected from OH-, SH-, NH- and CH-acid groups.

Preferably the at least one isocyanate reactive compound is a polyol, e.g. it may be selected from the group consisting of polyether polyols, polyester polyols, polyether ester polyols, polymer polyols, polycarbonate polyols and mixtures thereof.

A polyether polyol in the context of the present invention is an organic compound that contains at least ether and OH groups as functional groups. The polyether polyol typically has 2 to 20 OH groups, preferably 2 to 10 OH groups, particularly preferably 2 to 8 OH groups.

A polyester polyol in the context of the invention is an organic compound that contains at least ester and OH groups as functional groups. The polyester polyol typically has 2 to 20 OH groups, preferably 2 to 10 OH groups, particularly preferably 2 to 8 OH groups.

A polyether ester polyol in the context of the invention is an organic compound that contains at least ether, ester and OH groups as functional groups. The polyester ether polyol typically has 2 to 20 OH groups, preferably 2 to 10 OH groups, particularly preferably 2 to 8 OH groups.

A polycarbonate polyol in the context of the invention is an organic compound that contains at least carbonate and OH groups as functional groups. The polycarbonate polyol typically has 2 to 20 OH groups, preferably 2 to 10 OH groups, particularly preferably 2 to 8 OH groups The OH number of the polyol compounds is usually in the range from 20 to 1000 mg KOH/g, preferably in the range from 25 to 850 mg KOH/g, most preferably in the range from 50 to 600 mg KOH/g.

The polyether polyols are obtained by known methods, for example by anionic polymerization of alkylene oxides with addition of at least one starter molecule comprising from 2 to 8, preferably from 2 to 6, reactive hydrogen atoms in bound form in the presence of catalysts. As catalysts, it is possible to use alkali metal hydroxides such as sodium hydroxide or potassium hydroxide or alkali metal alkoxides such as sodium methoxide, sodium or potassium ethoxide or potassium isopropoxide, or in the case of cationic polymerization Lewis acids such as antimony pentachloride, boron trifluoride etherate or bleaching earth as catalysts. Furthermore, double metal cyanide compounds, known as DMC catalysts, can also be used as catalysts. Furthermore, polyetherols can be prepared using amines as catalyst as for example disclosed in WO2011/134866 or WO 2011/134856 A1.

Preference is given to using one or more compounds having from 2 to 4 carbon atoms in the alkylene radical, e.g. ethylene oxide, 1,2-propylene oxide, tetrahydrofuran, 1,3-propylene oxide, 1,2- or 2,3-butylene oxide, in each case either alone or in the form of mixtures, particularly preferably ethylene oxide and/or 1,2-propylene oxide, as alkylene oxides. Possible starter molecules are, for example, ethylene glycol, diethylene glycol, glycerol, trimethylolpropane, pentaerythritol, sugar derivatives such as sucrose, hexitol derivatives such as sorbitol, also methylamine, ethylamine, isopropylamine, butylamine, benzylamine, aniline, toluidine, toluenediamine, in particular vicinal toluenediamine, naphthylamine, ethylenediamine, di-ethylenetriamine, 4,4'-methylenedianiline, 1,3,-propanediamine, 1,6-hexanediamine, ethanolamine, diethanolamine, triethanolamine and other dihydric or polyhydric alcohols or monofunctional or polyfunctional amines. Preference is given to ethylene glycol, diethylene glycol, glycerol, trimethylolpropane, pentaerythritol, sugar derivatives such as sucrose and hexitol derivatives such as sorbitol and TDA, preferably vic-TDA.

The polyester polyols used are usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned. As further starting materials in the preparation of the polyesters, it is also possible to make concomitant use of hydrophobic materials. The hydrophobic materials are water-insoluble materials which comprise a nonpolar organic radical and have at least one reactive group selected from among hydroxyl, carboxylic acid, carboxylic ester or mixtures thereof. The equivalent weight of the hydrophobic materials is preferably in the range from 130 to 1000 g/mol. It is possible to use, for example, fatty acids such as stearic acid, oleic acid, palmitic acid, lauric acid or linoleic acid and also fats and oils such as castor oil, maize oil, sunflower oil, soybean oil, coconut oil, olive oil or tall oil.

The polyester polyols used preferably have a functionality of from 1.5 to 5, particularly preferably from 1.8 to 3.5. If isocyanate prepolymers are used as isocyanates, the content of compounds having groups which are reactive toward isocyanates is calculated with inclusion of the compounds having groups which are reactive toward isocyanates used for preparing the isocyanate prepolymers.

Polyetherester polyols are obtainable as a reaction product of i) at least one hydroxyl-containing starter molecule; ii) of one or more fatty acids, fatty acid monoesters or mixtures thereof; iii) of one or more alkylene oxides having 2 to 4 carbon atoms. The polyetherester polyols have preferably an average functionality in between 2.3 to 5.0, more preferably in between 3.5 to 4.7.

The starter molecules of component i) are generally selected such that the average functionality of component i) is preferably 3.8 to 4.8, more preferably 4.0 to 4.7, even more preferably 4.2 to 4.6. Optionally, a mixture of suitable starter molecules is used.

Preferred hydroxyl-containing starter molecules of component i) are selected from the group consisting of sugars and sugar alcohols (glucose, mannitol, sucrose, pentaerythritol, sorbitol), polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water.

Said fatty acid or fatty acid monoester ii) is generally selected from the group consisting of polyhydroxy fatty acids, ricinoleic acid, hydroxyl-modified oils, hydroxyl-modified fatty acids and fatty acid esters based in myristoleic acid, palmitoleic acid, oleic acid, stearic acid, palmitic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid. The fatty acid methyl esters are the preferred fatty acid monoesters. Preferred fatty acids are stearic acid, palmitic acid, linolenic acid and especially oleic acid, monoesters thereof, preferably methyl esters thereof, and mixtures thereof. Fatty acids are preferably used as purely fatty acids.

Suitable alkylene oxides iii) having 2 to 4 carbon atoms are, for example, ethylene oxide, propylene oxide, tetrahydrofuran, 1,2-butylene oxide, 2,3-butylene oxide and/or styrene oxide. Alkylene oxides can be used singly, alternatingly in succession or as mixtures.

According to the invention, polymer polyols are stable dispersions of polymer particles in a polyol and thus are not prone to settling or floating. The polymer particles are chemically grafted to the polyol and act as a better reinforcement filler so that the composition of the polymer may be adjusted to give the desired properties. Polymer polyols have a very low moisture content and thus avoid the problems of wet fillers. The polymers in polymer polyols generally have a low density in comparison to inorganic fillers, such as clays or calcium carbonate.

Suitable polymer polyols are selected from the group consisting of styrene-acrylonitrile (SAN) polymer polyols, polyurea suspension (PHD) polymer modified polyols and polyisocyanate polyaddition (PIPA) polymer modified polyols. Particularly preferred are SAN polymer polyols.

SAN polymer polyols are known in the art and are disclosed in Ionescu's Chemistry and Technology of Polyols and Polyurethanes, 2nd Edition, 2016 by Smithers Rapra Technology Ltd. In the SAN polymer polyols, a carrier polyol is the polyol in which the in-situ polymerization of olefinically unsaturated monomers is carried out, while macromers are polymeric compounds which have at least one olefinically unsaturated group in the molecule and are added to the carrier polyol prior to the polymerization of the olefinically unsaturated monomers.

SAN polymer polyols can preferably be used in an amount of up to 100 wt.-%, based on the total weight of the respective component, preferably based on the total weight of component C).

More preferably, it is in an amount in between 0.5 wt.-% to 70 wt.-%. Particularly for the production of refrigerators and freezers, it is an amount in between 3 wt.-% to 70 wt.-%. For the production of sandwich components, it is an amount in between 0.5 wt.-% to 35 wt.-%.

The SAN polymer polyols have preferably a hydroxyl number in between 10 mg KOH/g to 200 mg KOH/g. More preferably, the hydroxyl number is in between 10 mg KOH/g to 120 mg KOH/g.

The SAN polymer polyols are usually prepared by free-radical polymerization of the olefinically unsaturated monomers, preferably acrylonitrile and styrene, in a polyether polyol or polyester polyol, usually referred to as carrier polyol, as continuous phase. These polymer polyols are preferably prepared by in-situ polymerization of acrylonitrile, styrene or preferably mixtures of styrene and acrylonitrile, e.g. in a weight ratio of from 90:10 to 10:90 (styrene: acrylonitrile), preferably from 70:30 to 30:70 (styrene: acrylonitrile), using methods analogous to those described in DE 1111394, DE 1222669, DE 1152536 and DE 1152537.

The characteristics of the carrier polyol are determined partly by the desired properties of the final polyurethane material to be formed by the SAN polymer polyol. Carrier polyols are conventional polyols preferably having an average functionality in between 2.0 to 8.0, more preferably 2.0 to 3.0, and preferably a hydroxyl number in between 10 to 800 mg KOH/g, more preferably in between 10 to 500 mg KOH/g, even more preferably in between 10 to 300 mg KOH/g, most preferably in between 10 to 200 mg KOH/g. The polyols may be selected from the polyether polyols, polyester polyols and polyetherester polyols described above.

In an embodiment, mixtures of two or more polyols can also be used as carrier polyols.

Stream (B) comprises at least one organic polyisocyanate. The organic polyisocyanate contains at least two isocyanate groups. Possible organic polyisocyanates include the aliphatic, cycloaliphatic, araliphatic and preferably the aromatic polyfunctional isocyanates known per se. The organic polyisocyanates can optionally be modified.

Specific examples include: Alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic di- and polyisocyanates such as, for example, tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 2,4'-, 2,4'- and 2,2'-diisocyanates and polyphenylpolymethylene polyisocyanates (crude MDI) and mixtures of crude MDI and tolylene diisocyanates. The organic di- or polyisocyanates can be used individually or in the form of their mixtures.

Preferred polyisocyanates are tolylene diisocyanate (TDI), diphenylmethane diisocyanate (MDI) and especially mixtures of diphenylmethane diisocyanate and polyphenylenepolymethylene polyisocyanates (polymeric MDI or PMDI).

Use is frequently also made of modified polyfunctional isocyanates, i.e. products which are obtained by chemical reaction of organic polyisocyanates. Examples which may be mentioned are polyisocyanates comprising ester, urea, biuret, allophanate, carbodiimide, isocyanurate, uretdione, carbamate and/or urethane groups.

Very particular preference is given to employing polymeric MDI for the production of the rigid polyurethane foams according to the invention, for example Lupranat® M20 from BASF SE.

Furthermore, prepolymers and mixtures of the above-described isocyanates and prepolymers can be used as isocyanate component. These prepolymers are prepared from the above-described isocyanates and the polyethers, polyesters or both described above and have an NCO content of usually from 14 to 32% by weight, preferably from 22 to 30% by weight.

The polyurethane foam of the inventive thermal insulation element is usually prepared by means of at least one blowing agent selected from non-halogenated hydrocarbons, partially halogenated hydrocarbons and/or water.

Examples of partially halogenated hydrocarbons are $C_2$ to $C_6$ fluoroalkenes, particularly preferably $C_3$ to $C_6$ fluoroalkenes like propenes, butenes, pentenes and hexenes having 3 to 6 fluorine substituents, where other substituents such as chlorine may be present, examples are tetrafluoropropenes, fluorochloropropenes like trifluoromonochloropropenes, pentafluoropropenes, fluorochlorobutenes, hexafluorobutenes or mixtures thereof.

Fluorinated alkenes that are particularly preferred as blowing agents used for the preparation of the closed-cell rigid polyurethane foam are selected from the group consisting of cis- or trans-1,3,3,3-tetrafluoroprop-1-ene, 1,1,1-trifluoro-2-chloroprop-1-ene, 1-chloro-3,3,3-trifluoroprop-1-ene, 1,1,1,2,3-pentafluoroprop-1-ene, in cis or trans form, 1,1,1,4,4,4-hexafluorobut-2-ene, 1-bromopentafluoroprop-1-ene, 2-bromopentafluoroprop-1-ene, 3-bromopentafluoroprop-1-ene, 1,1,2,3,3,4,4-heptafluoro-1-butene, 3,3,4,4,5,5,5-heptafluoro-1-pentene, 1-bromo-2,3,3,3-tetrafluoroprop-1-ene, 2-bromo-1,3,3,3-tetrafluoroprop-1-ene, 3-bromo-1,1,3,3-tetrafluoroprop-1-ene, 2-bromo-3,3,3-trifluoroprop-1-ene, (E)-1-bromo-3,3,3-trifluoroprop-1-ene, 3,3,3-trifluoro-2-(trifluoromethyl)prop-1-ene, 1-chloro-3,3,3-trifluoroprop-1-ene, 2-chloro-3,3,3-trifluoroprop-1-ene, 1,1,1-trifluoro-2-butene and mixtures thereof.

Examples of non-halogenated hydrocarbon blowing agents are acyclic pentane isomers and/or cyclopentane, especially cyclopentane. Preference is given to using acyclic pentane isomers and/or cyclopentane in the range from 9% to 17% by weight, based on the total amount of the polyurethane reaction mixture. Preference is given to cyclopentane and mixtures of isopentane with cyclopentane having a content of at least 70% by weight of cyclopentane, and particular preference is given to using cyclopentane having a purity of at least 90% by weight, especially of at least 95% by weight.

Water is a chemical blowing agent which is especially preferably employed at a concentration of 1% to 8% by weight, preferably of 1.2% to 6%, more preferably 1.4% to 5% most preferably 1.5% to 3.5% by weight based on the total amount of polyurethane reaction mixture without physical blowing agent(s).

As catalysts, it is possible to use all compounds which accelerate the isocyanate-water reaction or the isocyanate-polyol reaction. Such compounds are known and are described, for example, in "Kunststoffhandbuch, volume 7, Polyurethane", Carl Hanser Verlag, 3rd edition 1993, chapter 3.4.1. These include amine-based catalysts and catalysts based on organic metal compounds. As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or alkali metal salts of carboxylic acids, e.g. potassium acetate or potassium formate.

Preference is given to using a mixture comprising at least one tertiary amine as catalyst. These tertiary amines may also bear groups which are reactive toward isocyanate, e.g. OH, NH or $NH_2$ groups. Some of the most frequently used catalysts are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene and diazabicyclononenene. Preference is given to using mixtures comprising at least two different tertiary amines as catalysts.

Stabilizers are added to stabilize the PU foam, examples are foam stabilizer and antioxidants. Foam stabilizers are materials which promote formation of a regular cell structure during foaming and are also called surfactants hereinafter. Examples are: silicone-comprising foam stabilizers such as siloxaneoxalkylene copolymers and other organopolysiloxanes. Also alkoxylation products of fatty alcohols, oxo alcohols, fatty amines, alkylphenols, dialkylphenols, alkylcresoles, alkylresorcinol, naphthol, alkylnaphthol, naphthylamine, aniline, alkylaniline, toluidine, bisphenol A, alkylated bisphenol A, polyvinyl alcohol and also alkoxylation products of condensation products of formaldehyde and alkylphenols, formaldehyde and dialkylphenols, formaldehyde and alkylcresoles, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers. Foam stabilizers are preferably used in an amount of from 0.5 to 5% by weight, particularly preferably from 1 to 3% by weight, based on the total weight of the components.

Chain extenders and cross linkers have usually a molecular weight between 49 g/mol to 499 g/mol. Bifunctional chain extenders and the trifunctional and higher-functional cross linkers or, if appropriate, mixtures thereof might be added. Chain extenders and/or cross linkers used are preferably alkanol amines and in particular diols and/or triols having molecular weights preferably in between 60 g/mol to 300 g/mol.

Flame retardants might be used as additives for the polyurethane foam. As flame retardants, it is generally possible to use the flame retardants known from the prior art. Suitable flame retardants are, for example, nonincorporable brominated substances, brominated esters, brominated ethers (Ixol) or brominated alcohols such as dibromoneopentyl alcohol, tribromoneopentyl alcohol and PHT-4-diol and also chlorinated phosphates such as tris(2-chloroethyl) phosphate, tris(2-chloropropyl) phosphate (TCPP), tris(1,3-dichloropropyl) phosphate, tricresyl phosphate, tris(2,3-dibromopropyl) phosphate, tetrakis(2-chloroethyl) ethylenediphosphate, dimethyl methanephosphonate, diethyl diethanolaminomethylphosphonate and also commercial halogen-comprising flame retardant polyols. It is possible to use phosphates or phosphonates such as diethyl ethanephosphonate (DEEP), triethyl phosphate (TEP), dimethyl propylphosphonate (DMPP), diphenyl cresyl phosphate (DPK) and others as further liquid flame retardants. Apart from the abovementioned flame retardants, it is possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and optionally maize starch or ammonium polyphosphate, melamine, expandable graphite and optionally aromatic polyesters for making the rigid polyurethane foams flame resistant. Preferable flame retardants are the recited phosphorus-containing flame retardants, particular preference being given to dimethyl propylphosphonate (DMPP), diethyl ethanephosphonate (DEEP), triethyl phosphate (TEP), diphenyl cresyl phosphate (DPK), triphenyl phosphate (TPP) and tris-(2-chloropropyl) phosphate (TCPP), with special preference being given to TCPP.

Further additives can be added to the reaction mixture for producing the polyurethane foams. Mention may be made of, for example, surface-active substances, cell regulators, fillers, dyes, pigments, hydrolysis inhibitors, fungistatic and bacteriostatic substances. Stream (C) comprises at least one compound selected from isocyanate reactive compounds, organic polyisocyanates, catalysts, blowing agents, chain extenders, stabilizers, crosslinkers, flame retardants, and additives as described above with the proviso that stream (C) is different from both streams (A) and (B), i.e. that the composition of stream (C) is different from the composition of streams (A) and (B). The difference may be for example the presence or absence of a compound or a different concentration of a compound, e.g. concentration of catalyst or blowing agent. According to one embodiment of the invention stream (C) differs from streams (A) and (B), respectively, in the presence and/or absence of at least one compound, i.e. stream (C) contains at least one additional compound which is not present in stream (A) and/or does not contain at least one compound which is present in stream (A) and stream (C) contains at least one additional compound which is not present in the stream (B) and/or does not contain at least one compound which is present in stream (B). A compound may be regarded as present in case its concentration in a stream is at least 0.03 wt.-%, based on the total weight of the stream.

The process according to the invention comprises steps (a) and (b), wherein in step (a) at least one first article is produced and in step (b) at least one second article is produced. Each of steps (a) and (b) comprise two sub steps wherein in sub step 1 a polyurethane reaction mixture is provided in a mixing device (MD) by mixing at least streams (A), (B), and (C), and in sub step 2 the polyurethane reaction mixture of sub step 1 is injected into a cavity of the article to be produced and the thermally insulating polyurethane foam is formed in situ. Within the cavity there can be an equal pressure as the ambient pressure or alternatively there can be vacuum, partial vacuum respectively, during foaming or at least at the start of injection, which then changes during foaming.

The mixing ratio of at least streams (A), (B) and (C) in step (a1) is different from the mixing ratio of streams (A), (B) and (C) in step (b1). Consequently, the polyurethane reaction mixtures of steps (a1) and (b1) have different compositions and contain different amounts of the three streams (A), (B), and (C), based on the total amount of the polyurethane reaction mixture.

The amount of stream (C) may be zero either in step (a1) or in step (b1), e.g. the polyurethane reaction mixture of step (a1) may be prepared by mixing (A), (B) and (C) and the polyurethane reaction mixture of step (b1) may be prepared by mixing (A) and (B) without (C) or vice versa. In case the amount of stream (C) is not zero in step (a1) or (b1), the amount of either stream (A) or (B) may be zero, e.g. the polyurethane reaction mixture of step (a1) may be prepared by mixing (A) and (B) and the polyurethane reaction mixture of step (b1) may be prepared by mixing (B) and (C) or vice versa. The term "not zero" means above zero.

According to one embodiment of the invention the amounts of each of streams (A), (B) and (C) are not zero in at least one of steps (a1) and (b1), i.e. the amount of stream (C) may be zero either in step (a1) or in step (b1), whereas the amounts of streams (A) and (B) are above zero in both steps (a1) and (b1).

According to another embodiment of the invention the amounts of each of the at least three streams (A), (B) and (C) are not zero in both steps (a1) and (b1).

It is also possible to use further streams (D), (E), etc. in addition to the at least three streams (A), (B) and (C) in sub steps (1) to add further flexibility to the process.

The at least three streams (A), (B) and (C) are usually liquid at the processing temperature, i.e. their viscosity is sufficiently low to feed them into the mixing device (MD) by pumps.

The compositions and mixing ratios of the at least three streams (A), (B), (C) and optionally further streams are preferably chosen such, that the organic polyisocyanates and the isocyanate reactive compounds present in the polyurethane reaction mixture are reacted in amounts such that the isocyanate index is 70 to 300, preferably 90 to 200, particularly preferably 100 to 150.

In steps (a1) and (b1) the at least three streams (A), (B) and (C) are mixed in a mixing device (MD). The at least three streams (A), (B) and (C) are usually provided from separate reservoirs of at least (A), (B) and (C), respectively. Such reservoirs may be tanks, barrels, container or other means for storing larger amounts of the at least three streams (A), (B) and (C). It is possible to feed all three streams simultaneously into the mixing device (MD) or to premix at least two of the at least three streams and feed the premixed streams into the mixing device (MD) simultaneously with the at least third stream after premixing.

It is preferred, that in steps (a1) and (b1) the at least three streams (A), (B) and (C) are provided from separate reservoirs of at least (A), (B) and (C), respectively, which are connected with the mixing device (MD) during steps (a1) and (b1), preferably the reservoirs are connected during the whole production process except necessary replacements for refilling of reservoirs. Such connection is usually provided by feeding tubes or pipes and may include valves and other dosing means and means for transporting the streams like pumps. These reservoirs may be connected directly with the mixing device (MD) or there may be a premixing device provided between the reservoirs of at least two of the streams and the mixing device (MD) allowing the premixing of these at least two streams before the premixed streams enter the mixing device (MD) simultaneously with the non-premixed stream(s) which are fed directly into the mixing device (MD) from their respective reservoir(s). The premixing of the streams is preferably carried out after the dozing of the streams, e.g. after the dozing pumps or valves, and before the mixing device (MD) and can be carried out at a separation of preferably less than 5 m from the mixing device (MD) by injecting one stream into another stream by opening a valve, with or without further requirement of any mixing devices, as described hereinabove. The separation between the end of premixing of streams and final mixing of all the streams in the mixing device (MD) is more preferably less than 50 cm and most preferably less than 20 cm.

The mixing device (MD) may be any mixing device known for the production of polyurethane foam containing articles by injecting a polyurethane reaction mixture into a cavity and in situ forming the foam. It is possible to use one mixing device or an assembly of two or more mixing devices for filling the cavity. The latter can for example useful in case the cavity is filled via multi-point injection, i.e. it is filled via more than one injection hole. The mixing devices (MD) used in an assembly may be same or different, preferably they are same.

Preferably the mixing device is a high pressure mixing head or low pressure mixing head, but most preferably a high pressure mixing head. Such high pressure mixing heads are commercially available. Just for clarification, the mixing device (MD) used in step (a1) is the same mixing device (MD) used in step (b1). Feeding of the mixing device is conducted generally via pumps, which can operate in low-pressure like 1 to 50 bar, more preferably 2-40 bar, most preferably 5-20 bar, or high-pressure like 50 to 260 bar, more preferably 90 to 230 bar most preferably 110-180 bar, in order to dispense the respective stream into a mixing head. Mixing within the mixing heads can be achieved among others by simple static mixer, low-pressure dynamic mixers, rotary element mixer as well as high-pressure impingement mixer. Mixing can be controlled by simply switching on and off but even by a process control software equipped with flow meters, so that parameters, such as mixing ratio or temperature can be controlled.

For example, mixing via high-pressure impingement apparatus can be done by simultaneous combination of the separated streams within a mixing chamber by using high pressure pumps for the entry of the separated streams via nozzles into the mixing chamber. Alternatively, mixing can be achieved in a subsequent manner, so that combination of some streams already occurs directly before a mixing chamber. Pre-mixing of streams before final mixing in a mixing chamber is conducted between the high-pressure pumps and the mixing chamber, where final mixing of all streams occurs. For instance, pre-mixing can be achieved by injecting one stream into another stream through opening a valve with or without further mixing devices, such as static or dynamic mixer. The distance between the end of pre-mixing of streams and final mixing of all streams have preferably a path length no longer than 2 m, more preferably no longer than 50 cm, most preferably no longer than 20 cm, so that incompatibility of the separated streams does not render the final product quality.

For example, the mixing head MT 18-4 from Hennecke can be applied for processing of multiple streams of components described as part of the invention. This mixing head can simultaneously inject up to four reaction components into the mixing chamber. From the mixing chamber, the reaction mixture flows into a 90° offset outlet pipe. This leads to a facilitated mixing with calm output of the mixture. The reaction mixture discharges in a laminar and splash-free way into the open mold. The mixing head offers a laminar output with injection into open molds in a range from 125 to 600 $cm^3/s$.

In steps (a2) and (b2) of the present process the polyurethane reaction mixtures provided in steps (a1) and (b1) are injected into a cavity of the first and second article, respectively, and the thermally insulating polyurethane foam is formed. It is possible to conduct the injection into the cavity and the foaming process while the cavity is at ambient pressure or alternatively a reduced pressure or vacuum can be applied to the cavity in order to accelerate the injection and filling process and to achieve a more even distribution of the polyurethane foam reaction mixture in the cavity. The reduced pressure may be applied only during the start of the injection or may be applied continuously throughout the filling and foaming process. During the injection and reaction of the polyurethane reaction mixture the cavity may by completely or almost completely surrounded by walls, e.g. a refrigerator housing or the double walls of a pipe, but the cavity may also be partially open and may be covered, a lid or sheet of covering material or the like after the foaming process, e.g. a refrigerator door, wherein an open recess of the door is filled with the polyurethane reaction mixture and is covered with a sheet of covering material afterwards.

Steps (a) and (b) are preferably carried out on the same production line or production unit. Each of steps (a) and (b) may be repeated two or more times. It is also possible to continue with step (a) after finishing the desired number of step (b). Another possibility of carrying out the present process is to add one or more further steps (c), (d), etc. wherein at least one third, fourth etc. article is produced and wherein the mixing ratios of steps (c1), (d1), etc. are different from the mixing ratios in the other sub steps 1.

The present process may be carried out by means of a control unit. Therefore, a further aspect of the present invention is a computer implemented process for producing a series of at least two articles containing thermally insulating polyurethane foam as described above, wherein the mixing ratios in steps (a1) and (b1) are controlled by a control unit configured to control the feeding of the at least three streams (A), (B), and (C) in steps (a1) and (b1) into the mixing device (MD). The feeding of the at least three streams may for example be controlled by adjusting the amount of each stream by controlling the flow rates of each feed stream or pressure and valve opening times in the mixing head, etc. The term "configured" means that the control unit is programmed to perform the functions required for the controlling of the feeding of the at least three streams (A), (B), and (C) in steps (a1) and (b1) into the mixing device (MD). The control unit typically comprises a controller or a processor. By way of example, the control unit may be a computer having means adapted to control the feeding of the at least three streams (A), (B), and (C) in steps (a1) and (b1) into the mixing device. Furthermore, the control unit may comprise a computer comprising a computer program comprising instructions to cause the control unit to control the feeding of the at least three streams (A), (B) and (C) in steps (a1) and (b1). According to one embodiment of the computer implemented process, the control unit is configured to control the feeding of the at least three streams (A), (B) and (C) into the mixing device (MD) from the reservoirs so that the at least three streams (A), (B) and (C) are fed into the mixing device (MD) in a first mixing ratio for producing at least one first article and in a second mixing ratio for producing at least one second article, wherein the first and the second mixing ratio are different.

According to another embodiment of the computer implemented process, the control unit is programmed to repeat step (a) with a first predefined mixing ratio for a first predefined number of times and to repeat step (b) with a second predefined mixing ratio for a second predefined number of times. This means, that for example a first series of e.g. 10, 20 or more articles are produced by repeating step (a) 10, 20 or more times with a specified ratio of streams (A), (B) and (C) and then a second series of e.g. 10, 20, or more articles are produced by repeating step (b) 10, 20 or more times a specified ratio of streams (A), (B) and (C) which is different from the specified ratio used in step (a). The articles produced by repeating step (a) are same and the articles produced in step (b) are same but differ from the articles produced in step (a).

According to another embodiment of the computer implemented process, the information about the articles to be produced is provided to the control unit by a sensor reading a sensor readable information tag provided with the articles to be produced and/or information about the ambient conditions of production is provided by a sensor detecting information about the ambient conditions of production.

The sensor readable information tag may be a RFID (radio-frequency identification) chip or a 2D code, such as QR (quick response) codes, variants of QR codes, datamatrix, Aztec code, JAB (just another bar code) code and bar code. The information tag may e.g. be attached directly to the casing or housing of the article like a label.

The information about ambient conditions of production is provided by a sensor detecting at least one ambient condition parameter. Such ambient condition parameters may be selected from temperature, air pressure, and humidity, but are not limited to these parameters. Such sensor is usually located in proximity to the production line or directly attached to it. The information about the ambient conditions during production provided to the control unit may control directly the mixing ratio of the at least streams (A), (B) and (C) according to predefined mixing ratios as a function of one or more ambient condition parameters or may be aligned with data from a data base for determining the mixing ratio as outlined below.

The information about the articles to be produced and/or the ambient conditions of production provided to the control unit may contain directly the mixing ratio of the at least streams (A), (B) and (C). It is also possible, that the information contains other data about the article to be produced which is aligned with data about the mixing ratios from a data base for determining the mixing ratio. Such other data is also called hereinafter "specification". For example, the specification may be a model number of the article to be produced or a value of an ambient condition parameter for which the necessary information about the mixing ratio is stored in the data base. The specification may also be a desired heat conductivity of the polyurethane foam or a desired viscosity value of the polyurethane reaction mixture or a desired blowing agent. The sensors transmit the specification to the data base, optionally via the control unit. The data base contains information about the determination of the correct mixing ratio in dependence of the specification received and determines the correct mixing ratio based on the specification and transmits the mixing ratio to the control unit. The control unit adjusts the feeding of the at least three streams (A), (B) and (C) into the mixing device (MD) in steps (a1) and (b1) accordingly, i.e. according to the mixing ratio contained in the information or determined by means of the data base. The data base may be located close to the control unit but can also be located remotely. The data base may be connected to the control unit via usual wired and wireless communication systems or networks like LAN, WLAN, Bluetooth® cellular network etc. It is also possible, that a self-learning artificial intelligence allows online optimization of the mixing ratios based on a feedback loop from data base.

An example of the computer implemented process described above which is influenced by ambient conditions is the production of articles containing a thermally insulating PU foam, wherein step (a) is repeated for several times at an ambient temperature T1. A sensor detecting the temperature at the production place then detects a change of temperature to a temperature T2 which requires the adaption of the reactivity of the polyurethane reaction mixture to maintain the same quality of the produced articles. The changed temperature T2 is transmitted by the temperature sensor to a data base, optionally via the control unit. The data base is configured for determining the mixing ratio in dependence of the temperature, e.g. by predefined mixing rations as function of the temperature and determines the mixing ratio adapted to T2 and transmits the adapted mixing to the control unit. The control unit continues with step (b) of the production process according to the adapted mixing ratio.

An example of the computer implemented process described above which is carried out by means of sensor readable information tags is the production of articles containing a thermally insulating PU foam, wherein the housings are provided with a sensor readable information tag containing a model number. A first set of articles with a first model number is produced in step (a) and a second set of articles with a second model number is produced in step (b). Each information tag is read by the sensor and the information is transmitted to a data base configured to determine the corresponding mixing ratio, e.g. by a table containing mixing ratios required for a certain model number, optionally via the control unit. The data base determines the correct mixing ratio for the model number and transmits the mixing ratio to the control unit. After producing the first set of articles with a first model number according to the mixing ratio obtained from the data base by means of the information tags in step (a) the process continues in step (b) with a different mixing ratio which is received by the control unit from the data base by means of the information tags of the second set of articles with a second different model number.

It is also possible to combine adjustments of the mixing ratios based on information about the articles to be produced with adjustments of the mixing ratios based on information about the ambient conditions in the production process, it is even possible to combine them in one step (a) and/or (b) of the process.

A further aspect of the present invention is a production unit for producing a series of at least two articles containing thermally insulating polyurethane foam according to the computer implemented process described above. This production unit comprises a mixing device (MD); separate reservoirs of at least three streams (A), (B), and (C) connected with the mixing device (MD); a mold carrier for the housings of the articles to be produced; and a control unit configured to control the feeding of the at least three streams (A), (B) and (C) into the mixing device (MD) from the reservoirs of at least (A), (B), and (C). The control unit controls the mixing ratios of the at least three streams in steps (a1) and (b1) into the mixing device (MD), in particular so that the mixing ratio of streams (A), (B) and (C) in step (a1) is different from the mixing ratio of streams (A), (B) and (C) in step (b1). The production unit may further comprise a sensor for reading sensor readable information tags and/or a sensor for detecting information about ambient conditions of production. In such cases, the production unit may additionally comprise an access to a data base containing information for determining the mixing ratios of the at least three streams (A), (B) and (C) to be fed in the mixing device (MD) based on the information provided by the sensor for reading sensor readable information tags from sensor readable information tags, which are usually provided with the articles to be produced, and/or provided by the sensor for detecting information about ambient conditions of production. The housing of an article is usually the outer part of the article to be produced, e.g. the outer shell of a refrigerator or an insulating box, which may form one border of the cavity in the article to be filled by the PU foam.

According to one embodiment of the production unit, the production unit comprises a control unit which is configured to control the feeding of the at least three streams (A), (B) and (C) into the mixing device (MD) from the reservoirs so that the at least three streams (A), (B) and (C) are fed into the mixing device (MD) in a first mixing ratio for producing at least one first article and in a second mixing ratio for producing at least one second article, wherein the first and the second mixing ratio are different.

Other aspects of the invention relate to a computer program comprising instructions to cause the production unit described above to execute the steps of the computer implemented process for producing a series of at least two articles containing thermally insulating polyurethane foam as described above and a computer-readable medium having stored thereon this computer program.

The invention is illustrated in more detail by the following examples without limiting the invention.

EXAMPLES

Examples E1 to E3 were prepared from three streams (A), (B) and (C) directly one after another in one mixing device (MD) by changing the mixing ratios of streams (A), (B) and (C) according to the invention resulting in a process comprising steps (a), (b) and a further step (c) wherein a third article is produced. For each example E1 to E6 2 sample articles were produced and used as test specimens. Examples E4, E5 and E6 were conducted separately to demonstrate different streams (A), (B) and (C) which can be used to conduct the process as described above resulting in polyurethane foams with different properties.

Polyols, isocyanates, blowing agents, additives and other raw materials

Polyols A to E:

Polyol A: Polyetherpolyol based on sucrose, glycerine and propylene oxide (PO); OH-value of 427 mg KOH/g; functionality: 6.0

Polyol B: Polyetherpolyol based on vic-TDA and PO; OH-value of 399 mg KOH/g; functionality: 3.9

Polyol C: Polyetherpolyol based on vic-TDA, ethylene oxide (EO) and PO; OH-value of 160 mg KOH/g; functionality: 3.9

Polyol D: Polymer polyol based on styrene and acrylonitrile (ratio 2:1, styrene:acrylonitrile; (SAN polymer polyol) derived from a polyether polyol based on glycerine, PO and EO (OH-value of 56 mg KOH/g, functionality=2.7); solid content of 45 wt.-%; OH-value of 30 mg KOH/g (c.f. Ionescu's Chemistry and Technology of Polyols and Polyurethanes, 2nd Edition, 2016 by Smithers Rapra Technology Ltd). SAN polymer polyols are available under the tradename, such as but not limited to, Lupranol® from BASF.

Polyol E: Polyether ester polyol based on sucrose, glycerol, PO and biodiesel, OH-value of 420 mg KOH/g; functionality: 4.5

Surfactant F:

Silicon surfactant Tegostab® B 84204 from Evonik

Catalyst Mixture G:

containing

Catalyst G1): Dimethylcyclohexylamine

Catalyst G2): Bis(2-dimethylaminoethyl)ether

Catalyst G3): Tris(dimethylaminopropyl)hexahydro-1,3,5-triazine or Potassium acetate Catalyst G4): Dimethylbenzylamine Blowing Agents:

CP95: Cyclopentane 95—cyclopentane with a purity >95%; e.g. from Haltermann Carless HCFO-1233zd: e.g. Solstice LBA from Honeywell HFO-1336mzz: e.g. Opteon 1100 from Chemours Isocyanate H:

Polymer-MDI with content of 31.5 wt.-% (Lupranat® M20S from BASF)

Analytical Methods Used

Water content by DIN 51777

OH value by DIN 53240

Amine value by DIN 16945

NCO content by DIN EN ISO 14896

Thermal Conductivity

Thermal conductivity was determined using a Taurus TCA300 DTX at a midpoint temperature of 10° C. To prepare the test specimens, the polyurethane reaction mixture was imported into a 2000×200×50 mm mold with 1517.5% overpacking and demolded 4.5 min later. After aging for 24 hours under standard conditions, several foam cuboids (at positions 10, 900 and 1700 mm on the lower end of the Brett molding) measuring 200×200×50 mm are cut out of the center. The top and bottom sides were then removed to obtain test specimens measuring 200×200×30 mm.

Determination of Demolding Behaviour

Demolding behaviour was determined by measuring the postexpansion of foam bodies produced using a 700×400×90 mm box mold at a mold temperature of 45±2° C. as a function of demolding time and the degree of overpacking (OP), which corresponds to the ratio of overall apparent density/minimum fill density. Postexpansion was determined by measuring the foam cuboids after 24 h. The post-expansion depicts the swelling of the foam block in mm.

Minimum Fill Density for a Component Part/Free Rise Density

Minimum fill density was determined by importing just a sufficient amount of polyurethane reaction mixture into a mold measuring 2000×200×50 mm at a mold temperature of 45±2° C. to just fill the mold. Free rise density was determined by allowing the foaming polyurethane reaction mixture to expand in a plastic bag at room temperature. The density was determined on a cube removed from the center of the foam-filled plastic bag.

General Procedure for Preparing the Reaction Mixture

A blowing agent was added to component A) and/or C). A TopLine HK 650/650/45P high pressure mixing device MT18-4 from Hennecke GmbH, operating at an output rate of 250 g/s was used to mix the components A) and C), which (one and/or both) have been admixed with the blowing agents, with the requisite amount of the component B), to obtain a desired mixing ratio. The temperature of components A), B) and C) were 20° C., while that of component C) was 30° C. in case of E5.

The reaction mixture was subsequently injected into molds, temperature regulated to 40° C., measuring 2000 mm×200 mm×50 mm and/or 400 mm×700 mm×90 mm and allowed to foam up therein. Overpacking was 14.5%, i.e., 14.5% more reaction mixture than needed to completely foam out the mold was used.

The results are shown in tables 1a and 1b. The amounts of the compounds are given in parts by weight (pbw). The composition of streams (A) and (B)) is the same in the examples E1 to E6. The compositions of streams (A) and (B) are also the same in examples E7-E10. The composition of stream (C) is the same in examples E2 and E3, but different in examples E4, E5 and E6. The composition of stream (C) is the same in examples E7-E10, but different from those in E1-E6. In examples E1 and E7, the amount of stream (C) is zero. Each example E1 to E10 could be regarded as a representative of a step (a1), (b1) or (c1) wherein a third article is produced by using a third mixing ratio. By combining suited examples E1 to E10 it becomes clear that different polyurethane foams can be obtained by just varying the mixing ratio of the streams (A), (B) and (C).

E.g. the combination of the three examples E1, E2 and E3 as well as the combination of examples E7, E8, E9, and E10 represent processes in which in step (a1), (b1) and (c1) streams (A), (B) and (C) are used in different mixing ratios. Namely for E1-E3, A:C:B is 100:0:127, 80:20:124, and 65:35:122, respectively, resulting in polyurethane foams with different thermal conductivities and post expansion values. Example E1 does not contain fluorinated blowing agents. Fluorinated blowing agents are usually more expensive than cyclopentane but result in a lower thermal conductivity. On the other hand, fluorinated blowing agents may interact undesirably with materials used for the casing, liner etc. In a similar way examples E1 and E4, E1 and E5 or examples E1 and E6 could be combined in a process according to the present invention yielding different polyurethane foams by varying the mixing ratios of streams (A), (B), and (C). For E7-E10, the respective mixing ratios are A:C:B is 100:0:131, 70:30:130, 30:70:128 and 0:100:128, respectively. In those cases, the formulations show different reactivities, so that the gel times of the systems can also be controlled via the mixing ratios of streams (A), (B), and (C).

TABLE 1a

|  | E1 | E2 | E3 | E4 | E5 | E6 |
|---|---|---|---|---|---|---|
| Stream A | | | | | | |
| Polyol A | 42.4 | 42.4 | 42.4 | 42.4 | 42.4 | 42.4 |
| Polyol B | 29.1 | 29.1 | 29.1 | 29.1 | 29.1 | 29.1 |
| Polyol C | 8.2 | 8.2 | 8.2 | 8.2 | 8.2 | 8.2 |
| Propylencarbonat | 1.8 | 1.8 | 1.8 | 1.8 | 1.8 | 1.8 |
| Silicon surfactant F | 2.6 | 2.6 | 2.6 | 2.6 | 2.6 | 2.6 |
| Catalyst mixture G | 2.1 | 2.1 | 2.1 | 2.1 | 2.1 | 2.1 |
| CP95$^a$ | 11.9 | 11.9 | 11.9 | 11.9 | 11.9 | 11.9 |
| $H_2O$ | 2.0 | 2.0 | 2.0 | 2.0 | 2.0 | 2 |
| Stream C | | | | | | |
| Polyol A | 35.7 | 35.7 | 35.7 | 37.9 | | 14.7 |
| Polyol B | 28.0 | 28.0 | 28.0 | 26.0 | | 34.0 |
| Polyol D | | | | | 89.5 | 23.4 |
| Propylencarbonat | 1.8 | 1.8 | 1.8 | 1.8 | 1.8 | 1.6 |
| Silicon surfactant F | 2.6 | 2.6 | 2.6 | 2.6 | 2.6 | 3.4 |
| Catalyst mixture G | 2.1 | 2.1 | 2.1 | 2.3 | 2.1 | 9.6 |
| $H_2O$ | 2.0 | 2.0 | 2.0 | 1.6 | 4.0 | 2.2 |
| HFO-1336mzz | 27.8 | 27.8 | 27.8 | | | |
| HFCO-1233zd | | | | 27.8 | | |
| CP95$^a$ | | | | | | 11.1 |
| Stream B | | | | | | |
| Isocyanate H | 100 | 100 | 100 | 100 | 100 | 100 |
| Mixing ratio A:C:B | 100:0:127 | 80:20:124 | 65:35:122 | 65:35:120 | 90:10:122 | 80:20:127 |
| Results from 3-component machine processing | | | | | | |
| Start time [s] | 4 | 4 | 3 | 4 | 4 | 3 |
| Gel time [s] | 40 | 41 | 40 | 42 | 38 | 28 |
| Free rise density [g/L] | 23.3 | 22.8 | 23 | 23.1 | 24.5 | 23.3 |
| Minimum filling density [g/L] | 31.3 | 30.2 | 30 | 30.1 | 32.0 | 31.1 |
| Post Expansion [mm] with 17.5% overpacking | | | | | | |
| 3 min | 3.7 | 3.2 | 2.3 | 3.8 | 3.1 | 3.1 |
| 4 min | 2.2 | 1.8 | 1.6 | 2.4 | 1.8 | 2.2 |

TABLE 1a-continued

|  | E1 | E2 | E3 | E4 | E5 | E6 |
|---|---|---|---|---|---|---|
| 5 min | 1.3 | 1.1 | 0.8 | 1.3 | 1.0 | 1.5 |
| compressive strength [N/mm2]; density: 35.5 g/L | 0.159 | 0.166 | 0.161 | 0.164 | 0.154 | 0.172 |
| Thermal conductivity [mW/mK] | 19.5 | 19.1 | 18.7 | 18.8 | 19.7 | 19.6 |

TABLE 1b

|  | E7 | E8 | E9 | E10 |
|---|---|---|---|---|
| Stream A | | | | |
| Polyol A | 39.9 | 39.9 | 39.9 | 39.9 |
| Polyol B | 27.3 | 27.3 | 27.3 | 27.3 |
| Polyol C | 7.0 | 7.0 | 7.0 | 7.0 |
| Polyol E | 6.2 | 6.2 | 6.2 | 6.2 |
| Propylencarbonat | 1.3 | 1.3 | 1.3 | 1.3 |
| Silicon surfactant F | 2.4 | 2.4 | 2.4 | 2.4 |
| Catalyst mixture G | 1.9 | 1.9 | 1.9 | 1.9 |
| CP95$^a$ | 11.9 | 11.9 | 11.9 | 11.9 |
| H$_2$O | 2.1 | 2.1 | 2.1 | 2.1 |
| Stream C | | | | |
| Polyol A | 36.9 | 36.9 | 36.9 | 36.9 |
| Polyol B | 26.4 | 26.4 | 26.4 | 26.4 |
| Polyol C | 6.1 | 6.1 | 6.1 | 6.1 |
| Polyol E | 8.8 | 8.8 | 8.8 | 8.8 |
| Propylencarbonat | 1.8 | 1.8 | 1.8 | 1.8 |
| Silicon surfactant G | 2.8 | 2.8 | 2.8 | 2.8 |
| Catalyst mixture G | 3.2 | 3.2 | 3.2 | 3.2 |
| CP95$^a$ | 11.9 | 11.9 | 11.9 | 11.9 |
| H$_2$O | 2.1 | 2.1 | 2.1 | 2.1 |
| Stream B | | | | |
| Isocyanate H | 100 | 100 | 100 | 100 |
| Mixing ratio A:C:B | 100:0:131 | 70:30:130 | 30:70:128 | 0:100:128 |
| Results from 3-component machine processing | | | | |
| Start time [s] | 4 | 4 | 3 | 2 |
| Gel time [s] | 40 | 34 | 29 | 26 |
| Free rise density [g/L] | 22.8 | 23.6 | 23.1 | 22.1 |
| Minimum filling density [g/L] | 30.3 | 31.3 | 30.5 | 29.7 |
| Post Expansion [mm] with 17.5% overpacking | | | | |
| 3 min | 3.3 | 3.2 | 3.0 | 2.6 |
| 4 min | 1.8 | 1.8 | 2.1 | 1.9 |
| 5 min | 1.1 | 1.2 | 1.2 | 1.2 |
| compressive strength [N/mm2]; density: 36.0 g/L | 0.177 | 0.167 | 0.170 | 0.187 |
| Thermal conductivity [mW/mK] | 19.6 | 19.4 | 19.4 | 19.3 |

The invention claimed is:

1. A discontinuous process for producing a series of at least two articles containing thermally insulating polyurethane foam from at least
   a stream (A) comprising at least one isocyanate reactive compound,
   a stream (B) comprising at least one organic polyisocyanate, and
   a stream (C) comprising either
     at least one compound selected from the group consisting of catalysts, blowing agents, chain extenders, stabilizers, crosslinkers, flame retardants, and additives, or
     at least one isocyanate reactive compound or at least one organic polyisocyanate, and optionally, at least one further compound selected from the group consisting of catalysts, blowing agents, chain extenders, stabilizers, crosslinkers, flame retardants, and additives;
   wherein stream (C) is different from both streams (A) and (B);
   wherein the process comprises:
   (a) producing at least one first article containing a first thermally insulating polyurethane foam by
      (a1) providing a first polyurethane reaction mixture in a mixing device (MD) by mixing at least two of streams (A), (B), and (C);
      (a2) injecting the first polyurethane reaction mixture provided in (a1) into a cavity of the at least one first article and forming the first thermally insulating polyurethane foam; and
   (b) producing at least one second article containing a second thermally insulating polyurethane foam by
      (b1) providing a second polyurethane reaction mixture in the mixing device (MD) by mixing at least two of streams (A), (B), and (C);
      (b2) injecting the second polyurethane reaction mixture provided in (b1) into a cavity of the at least one second article and forming the second thermally insulating polyurethane foam;
   wherein a mixing ratio of streams (A), (B), and (C) in (at) is different from a mixing ratio of streams (A), (B), and (C) in (b1),
   wherein an amount of stream (C) may be zero either in (a1) or in (b1), and
   wherein in case the amount of stream (C) is not zero in (a1) or (b1), an amount of stream (A) may be zero if stream (C) comprises at least one isocyanate reactive compound, and an amount of stream (B) may be zero if stream (C) comprises at least one organic polyisocyanate.

2. The process according to claim 1, wherein the at least one first article and the at least one second article differ in at least one physical and/or chemical property.

3. The process according to claim 1, wherein each of the first thermally insulating polyurethane foam and the second thermally insulating polyurethane foam is a rigid closed-cell polyurethane foam.

4. The process according to claim 1, wherein the at least one first article and the at least one second article are each selected from the group consisting of refrigerators: freezers; insulating boxes for cold and hot goods; water heaters; hot water storage tanks; insulation boards; and pipes.

5. The process according to claim 1, wherein in (a1) and/or (b1), the streams (A), (B), and (C) are fed simultaneously into the mixing device (MD), or
   wherein in (a1) and/or (b1), two of the streams (A), (B), and (C) are premixed and fed into the mixing device (MD) simultaneously with a remaining stream of the streams (A), (B), and (C).

6. The process according to claim 1, wherein in (a1) and (b1), the streams (A), (B), and (C) are provided from separate reservoirs for each of streams (A), (B), and (C), respectively, wherein each of the separate reservoirs are connected with the mixing device (MD) during (a1) and (b1).

7. The process according to claim 1, wherein in (a1) and/or (b1), an amount of each of streams (A), (B), and (C) is not zero.

8. The process according to claim 1, wherein the mixing device (MD) is not cleaned between (a) and (b).

9. A computer implemented process for producing a series of at least two articles containing thermally insulating polyurethane foam, the process comprising:
performing the process according to claim 1 with a control unit,
wherein mixing ratios in (a1) and (b1) are controlled by the control unit which is configured to control the feeding of the streams (A), (B), and (C) in (a1) and (b1) into the mixing device (MD).

10. The computer implemented process according to claim 9, wherein the control unit is programmed to repeat (a) with a first predefined mixing ratio for a first predefined number of times and to repeat (b) with a second predefined mixing ratio for a second predefined number of times.

11. The computer implemented process according to claim 9, wherein information about the at least one first article and the at least one second article is provided to the control unit by a sensor reading a sensor readable information tag provided with the at least one first article and the at least one second article, and/or wherein information about ambient conditions of production is provided to the control unit by a sensor for detecting the information about the ambient conditions of production.

12. The computer implemented process according to claim 11, wherein the sensor readable information tag is a RFID (radio-frequency identification) chip or a 2D code.

13. The computer implemented process according to claim 11, wherein the sensor for detecting the information about the ambient conditions of production detects at least one ambient condition parameter selected from the group consisting of temperature, humidity, and air pressure.

14. The computer implemented process according to claim 11, wherein the information about the at least one first article and the at least one second article and/or the information about the ambient conditions of production provided to the control unit either contains the mixing ratio of the streams (A), (B), and (C), or is aligned with data about the mixing ratio from a data base for determining the mixing ratio; and
wherein the control unit adjusts the feeding of the streams (A), (B), and (C) into the mixing device (MD) in (a1) and (b1) according to the mixing ratio.

15. The computer implemented process according to claim 12, wherein the 2D code is at least one selected from the group consisting of a QR (quick response) code, a variant of a QR code, a data matrix, an Aztec code, a JAB (just another bar code) code, and a bar code.

* * * * *